United States Patent Office 3,311,019
Patented Mar. 28, 1967

3,311,019
PROJECTION DEVICE FOR DETERMINING CO-
ORDINATES OF EQUIDISTANT CURVE CON-
STITUTING THE CONTOUR OF A WORKPIECE
Alexei Gavriiovich Valikov, Obolensky Pereulok 9, Korpus I, Kv. 53, Moscow, U.S.S.R.; Valentin Mikhailovich Eliseev, Kutuzovsky Prospect 43, Kv. 100, Moscow, U.S.S.R.; and Vasily Alexandrovich Busygin, Oktyabrsky Proezd 15, Kv. 18, Serpukhov, Moskovskoi Oblasti, U.S.S.R.
Filed May 3, 1965, Ser. No. 452,802
3 Claims. (Cl. 88—24)

This invention relates to projection devices for determination of geometrical dimensions of workpieces and, mainly, to projectors intended for determining coordinates of the equidistant curve constituting the contour of workpieces, preferably in checking workpieces machined on programme-controlled metal-cutting machine-tools, such as milling machines.

Now in use are projectors for checking geometrical dimensions of workpieces machined on programme-controlled metal-cutting machine-tools. Such projectors comprise an optical system which projects the image of the workpiece under check onto the main screen and is capable of moving relative to the workpiece being checked in three mutually perpendicular directions.

The above mentioned projectors for checking geometrical dimensions of workpieces, however, fail to provide direct determination of coordinates of the equidistant curve of the workpiece under check. It is common practice that calculation of coordinates of the equidistant curves is perfomed by analytical method, with the help of manually-operated calculators, with all kinds of human errors being inevitably involved.

Another method of finding coordinates of the equidistant curve consists in utilizing universal digital computers.

The above mentioned method of calculation of coordinates of the equidistant curve by employing universal digital computers is, however, extremely complicated and labour-consuming.

It is therefore an object of the present invention to provide such a projector that would considerably increase the accuracy of determination of coordinates of the equidistane curve constituting the contour of the workpiece.

It is another object of this invention to devise a projector that would provide direct and quick determination of coordinates of the equidistant curve without involving any calculation.

It is also an object of this invention to provide a projector which makes it possible to determine coordinates of both internal and external equidistant curves constituting the contour of the workpiece.

According to the present invention, provision is made of a projector which would enable the image of the workpiece under check to be compared against a master contour corresponding to the profile of the cutting tool; provision is also made of a projector which makes possible the direct determination of coordinates of the equidistant curve constituting the contour of the workpiece, with said contour of the workpiece under check and said master contour being moved in respect to each other.

According to the invention, a projector is provided with a device capable of reproducing onto the main screen an image corresponding to the profile of the cutting tool, preferably in the form of a master circle. Provision is also made of an auxiliary optical system equipped with an additional screen, said optical system enabling a portion of the image reproduced on said main screen to be projected onto said additional screen.

An embodiment of the present invention is described hereinbelow by way of example with reference to the accompanying drawings, wherein:

FIG. 3 is an auxiliary optical system for projecting a portion of the matched images of the master circle and the workpiece under check from the main screen onto an additional one.

Figure 1:
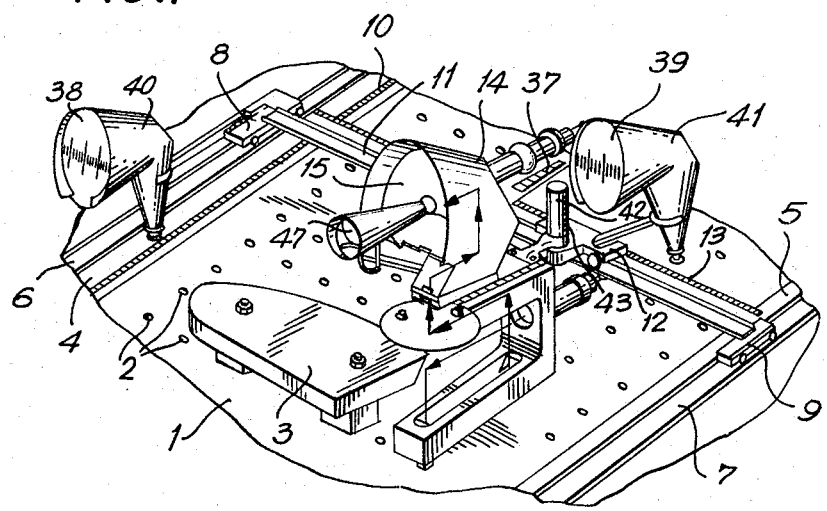
FIG. 1 is a general view of the projector for determining coordinates of the equidistant curve constituting the contour of the workpiece.

Referring now to FIG. 1, table 1 of the projector is provided with a series of locating holes 2 serving for accurate setting of workpiece 3 in the system of three mutually perpendicular coordinate axes. Situated above table 1 are frames 4 and 5 with mutually parallel guideways 6 and 7 rigidly affixed thereto, slides 8 and 9 being movably mounted on said guideways. Provision is made of linear scale 10 disposed on guideway 6.

Crosspiece 11 is mounted on slides 8 and 9, along which crosspiece slide 12 moves perpendicular to slides 8 and 9, said slide 12 being connected to the case of main projector 14. Crosspiece 11 is provided with linear scale 13 situated thereon.

The case of projector 14 accommodates an optical system for projecting the image of workpiece 3 onto main screen 15 of projector 14.

Figure 2:
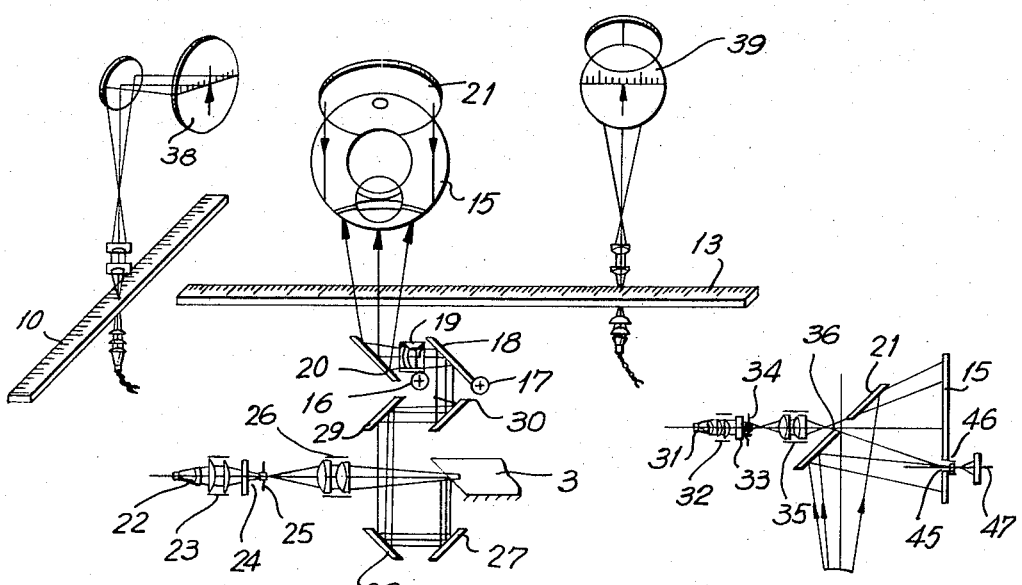
FIG. 2 is a light path in the projector illustrated in FIG. 1.

Within the above optical system the image of flat workpiece 3 (FIG. 2) illuminated by lamps 16 and 17 is reflected by mirror 18, focused by objective lens 19 through mirror 20 onto inclined mirror 21 and thence projected onto main screen 15.

In the cases where workpiece 3 is of substantial cross-section, the image of a cross-sectional silhouette of workpiece 3 is projected onto screen 15. To this end, the light beam emitted by light source 22 installed in the focus of condenser lens 23 is transmitted through light filter 24 and slit diaphragm 25 and is then directed by objective lens 26 onto workpiece 3. Subsequently, the cross-sectional silhouette of workpiece 3 is reflected by the system of mirrors 27, 28, 29 and 30 onto mirror 18 and then projected onto screen 15.

Behind the optical system projecting the image of workpiece 3 onto main screen 15, an auxiliary optical system is installed serving for the simultaneous projection onto main screen 15 of an image corresponding to the profile of the cutting tool in the form, say, of a master circle whose diameter corresponds to that of the milling cutter involved, the latter diameter being taken to the scale of the profile being projected. The radius of said circle is equal to the constant of the equidistant curve, that is to the constant distance between the contour being explored and the equidistant curve.

A light spot produced by the master circle passes from light source 31 through condenser lens 32, light filter 33 and detachable circular diaphragm 34, is projected by objective lens 35 onto mirror 21 wherefrom it passes through hole 36 provided in the centre of mirror 21 and, finally, is projected onto screen 15.

The radius of the master circle is adjustable by the variation of the radius of diaphragm 34 as well as through the axial movement along scale 37 of the optical system projecting said master circle (FIG. 1.)

The image of the master circle and that of the workpiece under check may be brought into coincidence by moving slides 8, 9 and 12 (FIG. 1).

When matching the images of the master circle and the contour to be explored, readings are taken off linear scales 10 and 13 whose images can be seen on screens 38 and 39 of read-out heads 40 and 41 respectively, the images of the scale marks being projected onto screens 38 and 39 by means of optical systems disposed within the common cases of said read-out heads 40 and 41 with said screens 38 and 39, said cases being mounted on slides 8 and 12.

When determining coordinates of the equidistant curves constituting the contours of flat portions of workpieces with substantial cross-section, projector 14 is capable of vertical movement on support 42 bearing scale 43, thereby making it possible to adjust projector 14 for height with reference to table 1.

Main screen 15 (FIG. 3) is turnably mounted and is provided in its middle movable portion 44, which is a matt plate, with tapered through hole 45, so that light beams which reproduce the image of the portion of the contour under check contiguous to the master circle, pass through hole 45 and are then projected and magnified many times by objective lens 46 onto additional screen 47 where a portion of curve 48 is the contour of the master circle whereas a portion of curve 49 is the contour of the workpiece under check.

The optical axis of the system for projecting the matched images of the master circle and the contour under check from main screen 15 onto additional screen 47 aligns with the geometrical axis of hole 45, thereby enabling any portion of the matched image to be observed.

According to the invention, the operation of the projector is based upon the matching of projected images of a flat contour (or a contour of heavy-section workpiece) and a contour of the master circle on the main screen, due to which matching coordinates of the equidistant curve of a contour of the workpiece under check are determined. To this end, workpiece 3 (FIG. 1) is mounted on table 1 by the use of location holes 2 whereupon the required radius of the master circle is set on scale 37. By moving projector 14 in three mutually perpendicular directions the contour of the workpiece under check and that of the master circle are matched on additional screen 47. When the contours of the master circle and the workpiece come into contact on additional screen 47, coordinates of the equidistant curve of the workpiece are read off screens 38 and 39 of read-out heads 40 and 41.

What is claimed is:

1. A projection device for determining coordinates of the equidistant curve constituting the contour of a workpiece, preferably in checking workpieces machined on programme-controlled metal-cutting machine-tools, comprising: an optical system serving the purpose of projecting the image of the workpiece under check onto a screen; means for moving said optical system in three mutually perpendicular directions with respect to the workpiece being check; means for measuring said movements of said optical system; a device for reproducing on said screen an image corresponding to the profile of a cutting tool, in the form of a master circle; an auxiliary optical system provided with an additional screen and serving to project a portion of the contour from said main screen onto said additional screen.

2. A projection device for determining coordinates of the equidistant curve constituting the contour of a workpiece, preferably in checking workpieces machined on programme-controlled metal-cutting machine-tools, comprising: a main optical system serving the purpose of projecting the image of the workpiece under check onto a main screen, said screen being turnably mounted and having a middle movable portion provided with a through hole, which middle portion is capable of rectilinear movement with respect to the remaining portion of said main screen; means for moving said main optical system in three mutually perpendicular directions with reference to the workpiece under check; means for measuring said movements of the main optical system; a device for reproducing onto said main screen an image corresponding to the profile of a cutting tool, in the form of a master circle; and an auxiliary optical system provided with an additional screen, said auxiliary optical system being rigidly connected to said movable portion of the main screen and disposed behind said through hole provided in said movable portion, which auxiliary optical system is capable of rectilinear movement along with said movable portion relative to the remaining portion of said main screen, thereby making it possible to observe on the additional screen of said auxiliary optical system any portion of the matched image of the workpiece under check and the master circle, said matched image being reproduced from said main screen.

3. A projection device for determining coordinates of the equidistant curve constituting the contour of a workpiece, preferably in checking workpieces machined on programme-controlled metal-cutting machine-tools, comprising: a basic structure provided with a series of locating holes wherein the workpiece to be checked is set; a main optical system serving the purpose of projecting the image of the workpiece under check onto a main screen; straight-lined guideways so installed on said basic structure as to enable said main optical system to be moved in three mutually perpendicular directions with reference to the workpiece being checked; linear scales disposed on said guideways; optical read-out heads connected to said main optical system and enabling the value of movements of said optical system relative to the workpiece under check to be read off said scales; said main screen turnably mounted and having a middle movable portion provided with a through hole, which middle portion is capable of rectilinear movement with respect to the remaining portion of said main screen; an auxiliary optical system provided with a detachable diaphragm and serving the purpose of projecting the image of the aperture of said diaphragm onto said main screen; another auxiliary optical system provided with an additional screen, said optical system being rigidly connected to said middle movable portion of the main screen and disposed behind said through hole provided in said movable portion, which optical system is capable of rectilinear movement along with said movable portion relative to the remaining portion of said main screen, thereby making it possible to observe on said additional screen any portion of the matched image of the workpiece and the aperture of said diaphragm, said matched image being reproduced from said main screen.

References Cited by the Examiner

UNITED STATES PATENTS

| | | | |
|---|---|---|---|
| 2,489,789 | 11/1949 | Korkosz | 88—24 |
| 2,747,463 | 5/1956 | Biggs | 88—24 |
| 2,879,692 | 3/1959 | Turner | 88—24 |
| 2,930,283 | 3/1960 | Smith et al. | 88—24 |

NORTON ANSHER, *Primary Examiner.*

R. M. SHEER, *Assistant Examiner.*